United States Patent
White, III et al.

(10) Patent No.: US 11,132,661 B1
(45) Date of Patent: Sep. 28, 2021

(54) SYSTEM AND METHOD FOR IMPLEMENTING DISTRIBUTED TRANSACTIONS FOR A GROUP PAY

(71) Applicant: JPMorgan Chase Bank, N.A., NY, NY (US)

(72) Inventors: James P. White, III, New York, NY (US); Eric Han Kai Chang, NY, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 824 days.

(21) Appl. No.: 15/461,844

(22) Filed: Mar. 17, 2017

Related U.S. Application Data

(63) Continuation-in-part of application No. 15/193,492, filed on Jun. 27, 2016.

(51) Int. Cl.
| | |
|---|---|
| *G06Q 40/00* | (2012.01) |
| *G06Q 20/22* | (2012.01) |
| *H04W 4/021* | (2018.01) |
| *G06Q 20/10* | (2012.01) |

(52) U.S. Cl.
CPC .......... *G06Q 20/29* (2013.01); *G06Q 20/102* (2013.01); *H04W 4/021* (2013.01)

(58) Field of Classification Search
USPC .......... 705/39, 38, 40, 37, 26, 319; 709/223; 719/328; 717/108; 715/704, 700; 726/2
See application file for complete search history.

(56) References Cited

U.S. PATENT DOCUMENTS

| | | | |
|---|---|---|---|
| 8,412,630 B2 * | 4/2013 | Ross | G06Q 40/02 705/42 |
| 8,612,349 B1 * | 12/2013 | Ledder | G06Q 40/02 705/42 |
| 8,676,674 B2 * | 3/2014 | Perlman | G06Q 20/40 705/30 |
| 10,325,253 B2 * | 6/2019 | Artman | G06Q 20/0855 |

(Continued)

OTHER PUBLICATIONS

Transactions in Distributed Event-Based Middleware; The 8th IEEE International Conference on E-Commerce Technology and The 3rd IEEE International Conference on Enterprise Computing, E-Commerce, and E-Services (CEC/EEE'06) (p. 53); L. Vargas, J. Bacon, K. Moody, Jan. 1, 2006. (Year: 2006).*

(Continued)

*Primary Examiner* — Tien G Nguyen
(74) *Attorney, Agent, or Firm* — Hunton Andrews Kurth LLP

(57) ABSTRACT

The invention relates to a method and system that processes a plurality of transactions shared by a group of members. A mobile device comprises: a memory; and a computer processor, coupled to the memory, programmed to: identify a plurality of members of a group sharing an event; identify a plurality of transactions made by each member of the group; determine whether each transaction is relevant to the event; automatically add each relevant transaction to the group; automatically categorize each transaction into a category associated with the event; and access, via an interactive display on the mobile device, a running total of expenses associated with the event and an individual share for a member of the group at a point in time.

20 Claims, 11 Drawing Sheets

(56) References Cited

U.S. PATENT DOCUMENTS

| | | | |
|---|---|---|---|
| 2010/0094732 A1* | 4/2010 | Smith | G06Q 20/02 |
| | | | 705/30 |
| 2011/0106698 A1* | 5/2011 | Isaacson | G06Q 30/06 |
| | | | 705/41 |
| 2012/0150728 A1* | 6/2012 | Isaacson | G06Q 20/28 |
| | | | 705/39 |
| 2012/0239417 A1 | 9/2012 | Pourfallah et al. | |
| 2015/0120345 A1* | 4/2015 | Rose | G06Q 20/3224 |
| | | | 705/5 |
| 2016/0275476 A1* | 9/2016 | Artman | G06Q 20/02 |

OTHER PUBLICATIONS

Managing group membership in ad hoc m-commerce trading systems; 2010 10th Annual International Conference on New Technologies of Distributed Systems (NOTERE) (pp. 173-180); Osman, H. Taylor, H. May 1, 2010. (Year: 2010).*

* cited by examiner

US 11,132,661 B1

SYSTEM AND METHOD FOR IMPLEMENTING DISTRIBUTED TRANSACTIONS FOR A GROUP PAY

CROSS REFERENCE TO RELATED APPLICATIONS

The application claims priority as a Continuation In Part (CIP) application to U.S. patent application Ser. No. 15/193,492, entitled "System and Method for Implementing Distributed Transactions, filed Jun. 27, 2016, the contents of which are incorporated herein in its entirety.

FIELD OF THE INVENTION

The invention relates generally to a system and method for processing group transactions, and more particularly to a system and method that manages, processes and distributes shared transactions for each member that participates in a group event.

BACKGROUND OF THE INVENTION

Oftentimes, when a group of friends enjoy a meal together at a restaurant, the bill is split by the number of friends. When a group gets quite large, servers are asked to split the bill by a large number of credit cards. The current process is time-consuming and the restaurant has to incur additional interchange fees for each separate credit card transaction. Another alternative is to have one person pay the bill with the hope that he or she will eventually get reimbursed.

These and other drawbacks currently exist.

SUMMARY OF THE INVENTION

According to one embodiment, the invention relates to a computer implemented system that processes a plurality of transactions shared by a group of members. A mobile device comprises: a memory; and a computer processor, coupled to the memory, programmed to: identify a plurality of members of a group sharing an event; identify a plurality of transactions made by each member of the group; determine whether each transaction is relevant to the event; automatically add each relevant transaction to the group; automatically categorize each transaction into a category associated with the event; and access, via an interactive display on the mobile device, a running total of expenses associated with the event and an individual share for a member of the group at a point in time.

The system may include a specially programmed computer system comprising one or more computer processors, mobile devices, electronic storage devices, and networks.

The invention also relates to computer implemented method that processes a plurality of transactions shared by a group of members. A method comprises the steps of: identifying a plurality of members of a group sharing an event; identifying a plurality of transactions made by each member of the group; determining whether each transaction is relevant to the event; automatically adding each relevant transaction to the group; automatically categorizing each transaction into a category associated with the event; and accessing, via an interactive display on the mobile device, a running total of expenses associated with the event and an individual share for a member of the group at a point in time.

The computer implemented system, method and medium described herein provide unique advantages to banking customers, according to various embodiments of the invention. The innovative system and method facilitates the ability to efficiently split transactions amongst multiple customers while maintaining the original transaction as a single transaction. The system eliminates multiple transactions for a vendor or merchant and ensures proper disbursement and payment of split transactions so that one person is not overburdened. The features of an embodiment of the present invention address the issue of many people trying to split a check at a restaurant or when a group of friends share expenses for a trip. The novel system enables a customer to initiate a distributed payment when the check comes and further enables the customer to resolve payments immediately. Other advantages include customer loyalty and retention due to the increased satisfaction of the account holder. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT(S)

Figure 1:
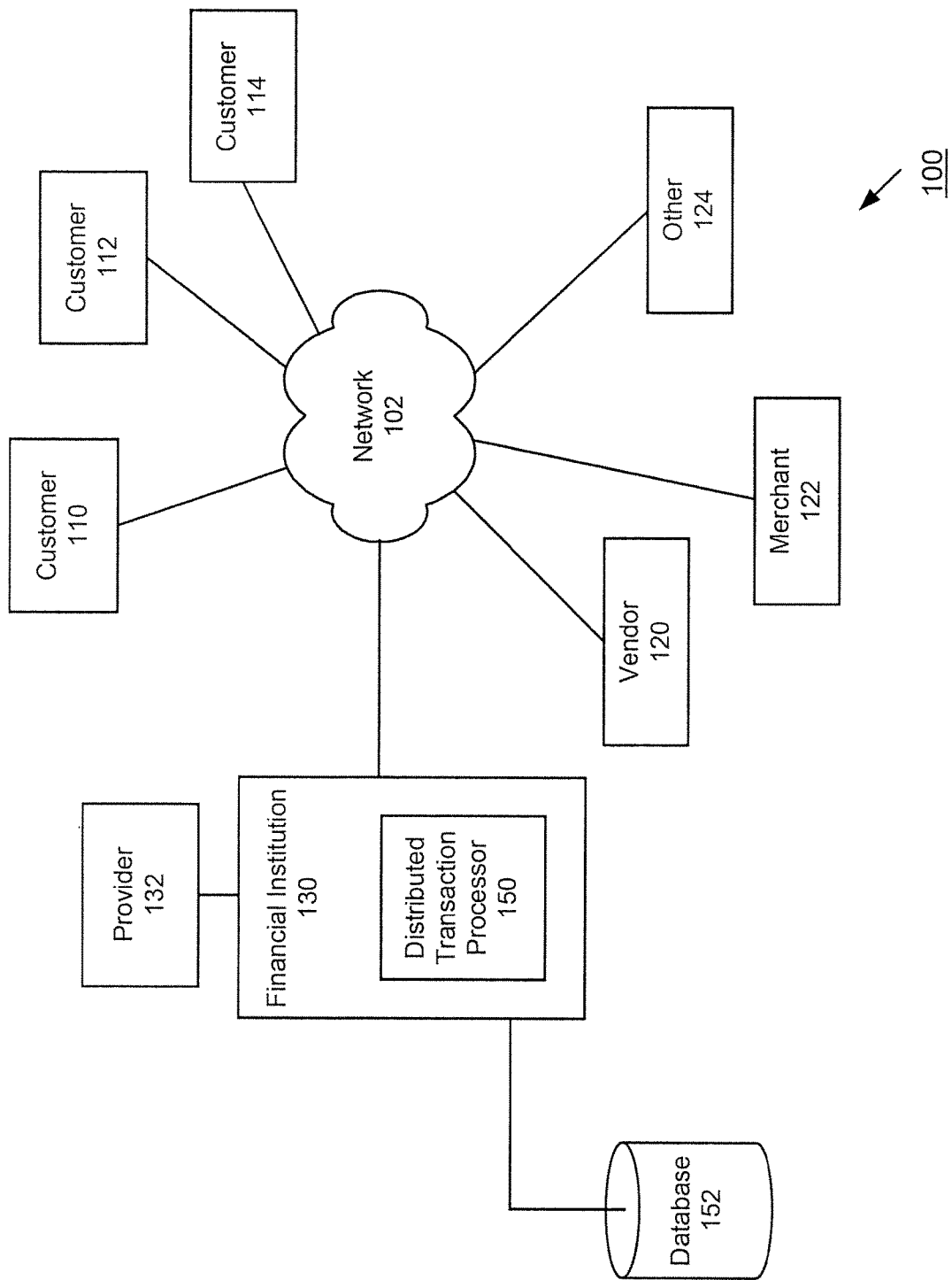
FIG. 1 illustrates a schematic diagram of a system that provide distributed transactions, according to an exemplary embodiment.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to distributed transactions that process as an external single transaction. For example, a customer may be at a restaurant with a group of friends. According to an embodiment of the present invention, the customer may prepay the restaurant bill with the customer's credit card and then initiate a distributed transaction feature for the bill. While the transaction is still pending, the amount charged to the original customer may be updated to reflect the distribution of charges. When the transaction has occurred in the past, the original customer may be reimbursed. According to an embodiment of the present invention, the restaurant may process the bill as a single transaction using the customer's payment instrument, e.g., credit card, loyalty card, etc. The customer may identify one or more other payors and a split factor or amount. The system may then split the transaction by the split factor and request payment from each payor for his or her share of the bill. For example, the system may split up the total of the cost of the transaction by the number of friends.

For each distributed transaction, the system of an embodiment of the present invention may split up an internal transaction identifier. In this example, a transaction identifier may be assigned to an original transaction. Upon processing the distributed transaction, the system may assign the transaction identifier to each of the co-payors. The details of the original transaction may also be distributed/split amongst all the payees as a record of the payment. In this manner, each payee may receive the details on their portion of the transaction, instead of a generic receipt.

Upon requesting a distributed transaction feature, the customer may identify one or more co-payors in various ways. According to another embodiment of the present invention, the distributed transaction feature may be enabled via push messages, touch-id authentication, email alerts, etc. Also, by requesting a distributed transaction, the customer may receive a code, identifier, image, that may be shown and/or shared with other co-payors. For example, the additional payors may scan a QR code and be automatically added to a transaction record. The original customer may be able to dictate who owes what, how much, and/or other specifics of the transaction distribution. In this manner, the merchant may process a single transaction, where the transaction is then distributed to multiple payors.

Once the system of an embodiment of the present invention initiates a distributed/shared transaction, the system may predict potential payors to be added to a transaction request. This greatly increases customer business intelligence and spending habit data. For a merchant, such as a restaurant owner, the distributed transaction may increase turnaround time on tables during bill settlement and thereby increase efficiency and customer satisfaction.

The following descriptions provide different configurations and features according to exemplary embodiments. While certain nomenclature and types of applications/hardware are described, other names and application/hardware usage is possible and the nomenclature provided is done so by way of non-limiting examples only. Further, while particular embodiments are described, it should be appreciated that the features and functions of each embodiment may be combined in any combination as is within the capability of one of ordinary skill in the art. The figures provide additional exemplary details regarding the present invention. It should also be appreciated that these exemplary embodiments are provided as non-limiting examples only.

Various exemplary methods are provided by way of example herein. These methods are exemplary as there are a variety of ways to carry out methods according to the present disclosure. The methods depicted and described can be executed or otherwise performed by one or a combination of various systems and modules. Each block shown in the methods represents one or more processes, decisions, methods or subroutines carried out in the exemplary method, and these processes, decisions, methods or subroutines are not necessarily carried out in the specific order outlined in the methods, nor is each of them required.

FIG. 1 illustrates a schematic diagram of a system that provides distributed transactions, according to an exemplary embodiment. As illustrated, network 102 may be communicatively coupled with one or more data devices including, for example, computing devices associated with customers 110, 112, 114. Such devices may include mobile devices, including mobile phones, smart devices, etc. Network 102 may communicate with various vendors 120, merchants 122 as well as other providers, represented by 124. In addition, Network 102 communicates with Financial Institution 130 that provides credit and debit transaction processing. Financial Institution 130 may include a Distributed Transaction Processor 150 that facilitates processing of distributed transactions amongst a group of customers. Customer profile data, account data, transaction data and historical data may be stored and managed by Database 152. Also, Database 152 may also store payment rules, e.g., which payment instrument to use for certain transaction, merchants, situations, time periods, etc. The distributed transaction features described herein may be provided by Financial Institution 130 and/or a third party provider, represented by 132, where Provider 132 may operate with Financial Institution 130 or other entity. Distributed Transaction Processor 150 may process transactions, according to an exemplary embodiment of the present invention.

The system 100 of FIG. 1 may be implemented in a variety of ways. Architecture within system 100 may be implemented as hardware components (e.g., module) within one or more network elements. It should also be appreciated that architecture within system 100 may be implemented in computer executable software (e.g., on a tangible, non-transitory computer-readable medium) located within one or more network elements. Module functionality of architecture within system 100 may be located on a single device or distributed across a plurality of devices including one or more centralized servers and one or more mobile units or end user devices. The architecture depicted in system 100 is meant to be exemplary and non-limiting. For example, while connections and relationships between the elements of system 100 is depicted, it should be appreciated that other connections and relationships are possible. The system 100 described below may be used to implement the various methods herein, by way of example. Various elements of the system 100 may be referenced in explaining the exemplary methods described herein.

The network 102 may be a wireless network, a wired network or any combination of wireless network and wired network. For example, the network 102 may include one or more of an Internet network, a satellite network, a wide area network ("WAN"), a local area network ("LAN"), an ad hoc network, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11g, 802.11n, 802.11ac, or any other wired or wireless network for transmitting or receiving a data signal. Also, the network 102 may support an Internet network, a wireless communication network, a cellular network, Bluetooth, or the like, or any combination thereof. The network 102 may further include one, or any number of the exemplary types of networks mentioned above operating as a stand-alone network or in cooperation with each other. The network 102 may utilize one or more protocols of one or more network elements to which it is communicatively coupled. The network 102 may translate to or from other protocols to one or more protocols of network devices. Although the network 102 is depicted as one network for simplicity, it should be appreciated that according to one or more embodiments, the network 102 may comprise a plurality of interconnected networks, such as, for example, a service provider network, the Internet, a cellular network, corporate networks, or even home networks, or any of the types of networks mentioned above.

Data may be transmitted and received via network 102 utilizing a standard networking protocol or a standard telecommunications protocol. For example, data may be transmitted using Session Initiation Protocol ("SIP"), Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet Protocols ("TCP/IP"), hypertext transfer protocol ("HTTP"), hypertext transfer protocol secure ("HTTPS"), real time streaming protocol ("RTSP"), or other protocols and systems suitable for transmitting and receiving data. Data may be transmitted and received wirelessly or in some cases may utilize cabled network or telecom connections such as an Ethernet RJ45/Category 5 Ethernet connection, a fiber connection, a cable connection or other wired network connection.

While FIG. 1 illustrates individual devices or components, it should be appreciated that there may be several of such devices to carry out the various exemplary embodiments. Customer 110, 112, 114 may communicate using any mobile or computing device, such as a laptop computer, a personal digital assistant, a smartphone, a smartwatch, smart glasses, other wearables or other computing devices capable of sending or receiving network signals. Customer devices may have an application installed that is associated with Financial Institution 130.

Financial Institution 130 may be communicatively coupled to Database 152. For example, Database 152 may store customer account data, prior transactions, payment rules, profile data, etc. Database 152 may include any suitable data structure to maintain the information and allow access and retrieval of the information. For example, Database 152 may keep the data in an organized fashion and may be an Oracle database, a Microsoft SQL Server database, a DB2 database, a MySQL database, a Sybase database, an object oriented database, a hierarchical database, a flat database, and/or another type of database as may be known in the art to store and organize data as described herein.

Database 152 may be any suitable storage device or devices. The storage may be local, remote, or a combination thereof with respect to Database 152. Database 152 may utilize a redundant array of disks (RAID), striped disks, hot spare disks, tape, disk, or other computer accessible storage. In one or more embodiments, the storage may be a storage area network (SAN), an internet small computer systems interface (iSCSI) SAN, a Fiber Channel SAN, a common Internet File System (CIFS), network attached storage (NAS), or a network file system (NFS). Database 152 may have back-up capability built-in. Communications with Database 152 may be over a network, such as network 102, or communications may involve a direct connection between Database 152 and Financial Institution 130, as depicted in FIG. 1. Database 152 may also represent cloud or other network based storage.

Having described an example of the hardware, software, and data that can be used to run the system, an example of the method and customer experience will now be described. The method will be described primarily as an example in which a customer downloads a software application (sometimes referred to as an "app") and uses it to perform banking transactions and/or other functionality, including making purchases. However, those skilled in the art will appreciate that the principles of the invention can be applied to related circumstances, such as where the entity providing the app is a business other than a financial institution, or where the financial institution app functionality is provided through a browser on the customer's mobile device rather than through a software application (app) downloaded to the customer's mobile device, and with purchases from various providers.

Figure 2:
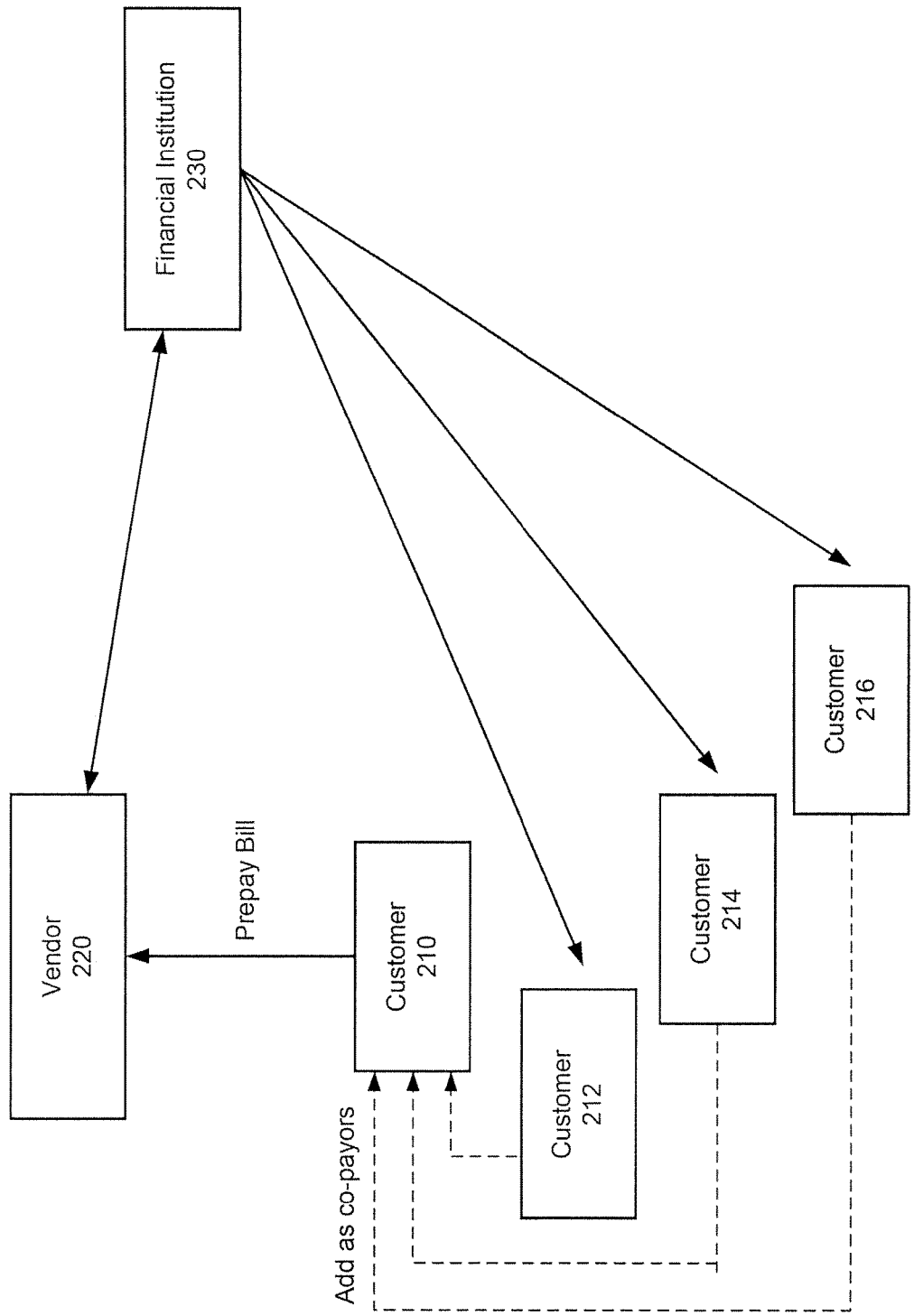
FIG. 2 is an exemplary flow diagram that illustrates distributed transactions, according to an embodiment of the present invention.

FIG. 2 is an exemplary flow diagram that illustrates distributed transactions, according to an embodiment of the present invention. In this illustration, Customer 210 makes a transaction at Vendor 220. Vendor 220 may be a restaurant, merchant, service provider, etc. In this example, Customer 210 has a group of friends, Customer 212, 214 and 216 who each owe a portion of the transaction amount. Each customer may owe the same amount (e.g., a quarter of the transaction amount). Also, each customer may owe varying amounts, percentages, etc. Vendor 220 processes the transaction as a single transaction, where Customer 210 may prepay the transaction. Customer 210 may prepay the entire transaction amount and is later charged for only the Customer's portion of the amount. Customer 210 may be reimbursed for the remaining amount. Other variations may be realized.

Before, simultaneously with or even after prepayment, Customer 210 may request a distributed transaction via a mobile device or other input. Also, with an electronic menu or at checkout, the customer may request a distributed transaction with the vendor. The vendor may then initiate the distributed transaction feature.

Customer 210 may then identify additional payors, in this example, Customers 212, 214 and 216. The additional customers may be located with (or nearby) Customer 210. Also, Customer 210 may make a transaction on behalf of other customers. Co-payor identification may occur in various ways. For example, Customer 210 may select customers from a contact list from the Customer's mobile phone. Also, the customer may select from a more focused contact list based on geo-location, e.g., contacts who are nearby, within a predetermined distance, within a geo-fence, at the same restaurant, store, vendor, historical data, prior activity, and/or other parameter.

Also, near field technology may automatically recommend co-payors. Co-payors may also be suggested based on customer behavior, past transactions, historical data, etc. For example, a group of co-payors may be suggested based on weekly happy hour drinks. According to another example, machine learning may be applied to recognize that a customer goes to a favorite diner for brunch every weekend for book club. The identities of the co-workers may be suggested by the system. Also, Customer 210 may receive a code and automatically share or transmit the code with the co-payors. Other behavior and conduct may be recognized.

Each co-payor may receive a notification informing the co-payor that they are responsible for a certain portion of the transaction amount. Each payor may then accept, confirm or otherwise acknowledge the notification.

The system may identify a distribution factor, percentage or amount. For example, using the number of co-payors, the system may divide the transaction amount amongst the identified co-payors. Financial Institution 230 may then request payment from each of the identified co-payors for a respective amount. The distribution factor may also represent a portion of the bill based on the amount spent by each customer. For example, the vendor may be a restaurant where each customer's order may be captured via an electronic menu interface. Using this information, the system may then calculate a more precise transaction amount based on each customer's order.

According to another example, the transaction may be split based on the original customer's input, which may be split by the number of co-payors, transaction amount, percentage or other fraction. For example, the transaction may be split differently when there are families with varying number of family members. For example, three families may split the bill where one family is a couple, another family has 2 young children and a third family is a family of 5 with three grown children. The bill may be split differently to accommodate family size. For example, each adult may be counted as "1" and each child under the age of 12 may be counted as "0.5." In this example, the first family may be charged 1/5 of the bill, the second family may be charged 3/10 of the bill and the third family may be charged 1/2 of the bill. Other variations may be implemented.

Figure 3:
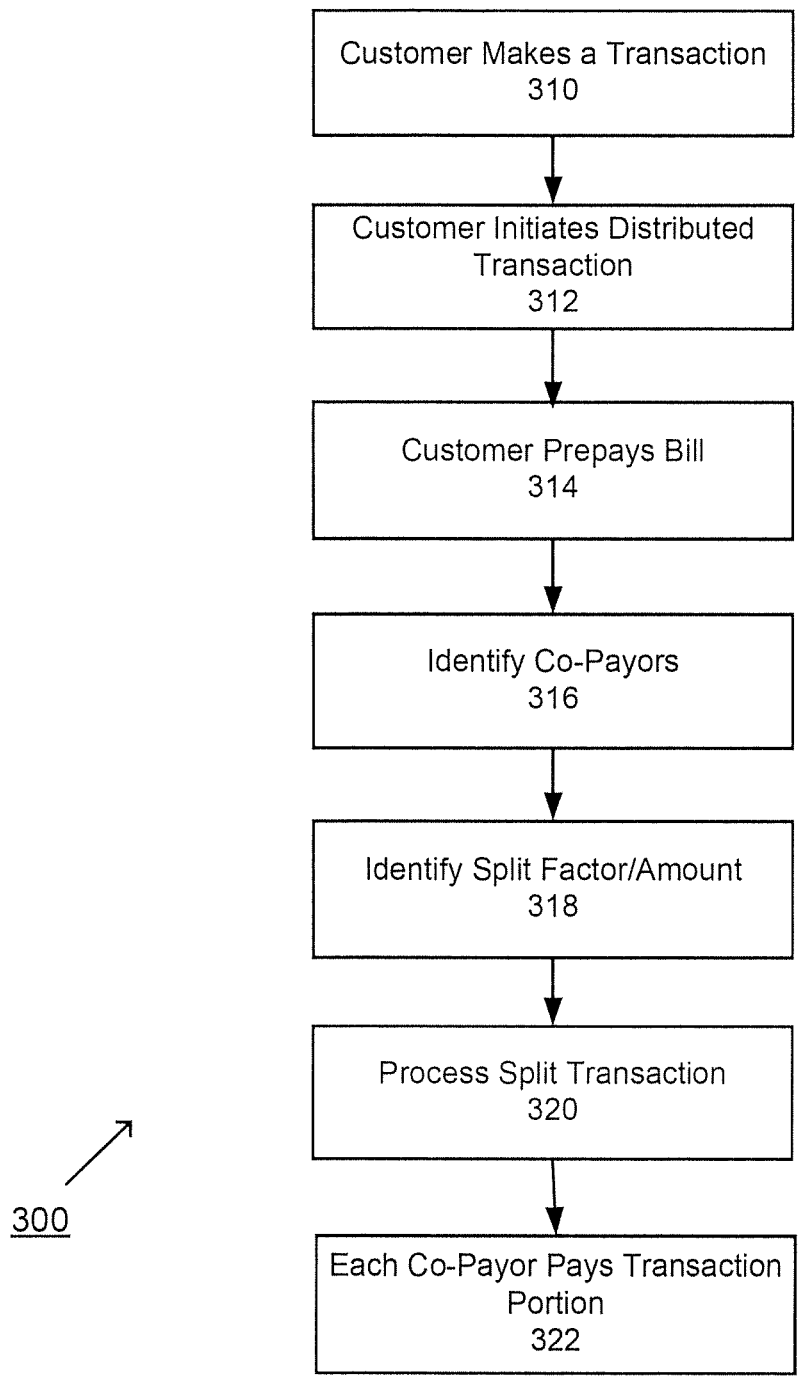
FIG. 3 is an exemplary flowchart for implementing distributed transactions, according to an embodiment of the present invention.

FIG. 3 is an exemplary flowchart of a method for distributed transactions, according to an embodiment of the present invention. At step 310, an original customer may make a transaction at a vendor. At step 312, the customer may initiate a distributed transaction feature. At step 314, the customer may prepay the bill for a group. At step 316, the customer identify one or more co-payors. At step 318, the customer may identify a split factor or amount. At step 320, a financial institution or other provider may process or split the transaction amount based on the split factor. At step 322, each payor may pay a portion of the transaction based on the split factor. The order illustrated in FIG. 3 is merely exemplary. While the process of FIG. 3 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

At step 310, an original customer may make a transaction at a vendor. The transaction may include any transaction with multiple payors. For example, a group of friends may order food, e.g., pizzas to be delivered to one friend's house. Rather than having one person bear the entire cost of the delivery, an embodiment of the present invention may facilitate splitting the cost among the group of friends. Other scenarios may include roommates splitting utility bills, groceries, rent, repairs, etc. Additional scenarios may include sharing a cab ride, splitting vacation costs, rental homes, concert tickets, etc.

At step 312, the customer may initiate a distributed transaction feature. The feature may be initiated by a button or other input on a mobile device and/or other interface, which may be associated with the customer, vendor, merchant, service provider and/or other entity.

At step 314, the customer may prepay the bill for a group. The customer may pay with a selected payment instrument. Also, the system may automatically select a payment instrument that maximizes reward and other loyalty points. For example, the system may recognize that the customer is at a restaurant and thereby select a credit card that maximizes the customer's reward points. According to another example, the system may recognize that the transaction is a travel expense and use a payment instrument that maximizes travel loyalty points. A customer may set up rules so that the system may automatically identify an appropriate payment instrument. Also, the system may learn based on prior transaction which payment instrument to use. In addition, the system may select a payment instrument that maximizes accumulation of reward or loyalty points. Other preferences and/or rules may be set up and stored in a database or other form of memory.

At step 316, the customer identify one or more co-payors. The co-payors may be located with the customer (e.g., same restaurant, same table, same store, etc.). Also, the customer may make a purchase on behalf of a group of friends, e.g., online purchase, merchant transaction, etc. The customer may identify co-payors by selecting one or more contacts through a contact list on the customer's mobile device. Also, the customer may share a code, e.g., identifier, image, QR code that may be received by the co-payors. Other mechanisms may include push notification, text, email and/or other forms of electronic communication.

According to another example, the system may use geo-location technology and recognize that the original customer is sitting at a table with a group of friends and identify each friend based on proximity and location. The system may also use close range technology, such as NFC, Bluetooth, WiFi, etc., to identify a group of friends. For example, the customer may set up a Wi-Fi for a short time period and allow his friends to join. Other variations may be implemented.

Further, the system may implement machine learning to identify customer behavior and likely co-payors. For example, a customer may frequent a local restaurant with a group of colleagues every Thursday night after work. The system may learn and recognize the group of colleagues as co-payors.

Also, an embodiment of the present invention may define groups of payors that the customer frequently shares costs with. For example, a customer may have a co-worker group, roommate group, book club group, family group, etc. The groups may be automatically formed and suggested to the customer, as the customer utilizes the distributed transaction feature. The group may be fainted based on transaction data, historical data, user preference and/or other consideration.

At step 318, the customer may identify a split factor or amount. The split factor may be based on the number of total payors. Other variations may include percentage, dollar amount, variable amount, etc. In addition, the split factor may be based on items ordered for each payor. For example, a group of friends may each identify meal and beverage through an electronic menu. The corresponding data or amount for each customer may be used to determine a split factor for the transaction.

According to another example, the system may provide a default amount based on the number of payors. The original customer may then increase or decrease the amount per person, e.g., sliding scale or other input. Also, the participating payors may increase or decrease the amount where the total amount is adjusted accordingly amongst the other payors. In this example, each payor may modify his or her attributed amount via each payor's mobile device or other input. The system may accept the split factor once the entire amount of the transaction is accounted. Other variations may be implemented.

At step 320, a financial institution or other provider may process or split the transaction amount based on the split factor. In the restaurant bill example, the original customer may be requested to pay a portion of the bill as determined by the split factor. According to another example, the original customer may be credited for the pre-paid amount and requested to pay a portion. In yet another example, the original customer may be reimbursed for the enter transaction and charged for only the original customer's portion once the other payors have paid their portion of the transaction. Other variations may be implemented.

At step 322, each payor may pay a portion of the transaction based on the split factor. The system may request payment from each payor. Also, the system may automatically process the transaction for each payor. Based on customer preference or predetermined rules, the system may initiate the transaction using an appropriate payment instrument. The payment instrument may be a credit card with an optimal rewards program. Accordingly, each payor may receive his or her portion of reward points based on the split transaction. Also, each payor may review transaction details rather than a generic amount.

An embodiment of the present invention is directed to consolidating transactions for a group, collecting funds from each group member and then distributing properly. According to an exemplary scenario, an embodiment of the present invention manages and consolidates related charges for a group. A group may include friends who take a trip together. The group may include individual friends as well as families of varying sizes and ages. The group may be for a day trip, a long weekend, a month long journey as well as other time duration. The group may relate to various events, such as a trip, lunch, an occasion (e.g., movie, night out, etc.), and/or other purpose. The embodiments of the present invention may be applied to any group having a plurality of members where the members share costs, resources, points, time, rewards, funds, responsibilities, etc.

In the example of a beach trip, related changes may include beach rental, transportation costs, groceries, entertainment and/or other expenses. The system of an embodiment of the present invention may track related changes and then sum up the total amount owed by each group member. The system may then perform calculations to determine who owes what amount from the total, automatically accounting for the member who paid the original costs. The funds may then be collected in a manner pursuant to the distributed transactions functionality described herein.

Based on the group, the expenses may be distributed in various ways. For example, the expenses may be split evenly by the number of people. Other factors may be considered. For example, one member may have skipped a group activity. For this expense, the member who skipped the activity may not be required to share in the expense. Also, another member may leave a trip early (e.g., leave on day 3 of a 5 day vacation). In this example, the member may be asked to split only a portion of the trip (e.g., a split factor of ⅗ for the lodging and groceries). For a family vacation, a family of five may have a different split factor than a couple without any kids, or even a couple with young children. Other variations may be applied.

An embodiment of the present invention may maintain payment data (e.g., vendor, date, amount, etc.) in a manner that is not obfuscated by third party payment systems. Additionally, the distributed transactions may earn credit card and loyalty rewards, such as miles and points for each group member. The system of an embodiment of the present invention preserves payment metadata, earning of points and miles, etc. An embodiment of the present invention provides a simplified and streamlined solution to calculation, collecting, and distributing shared payments.

As illustrated in FIG. 1 above, Customers 110, 112 and 114 may form a group. Similarly, Customers 210, 212, 214 and 216 in FIG. 2 may participate in a group event.

Figure 4:
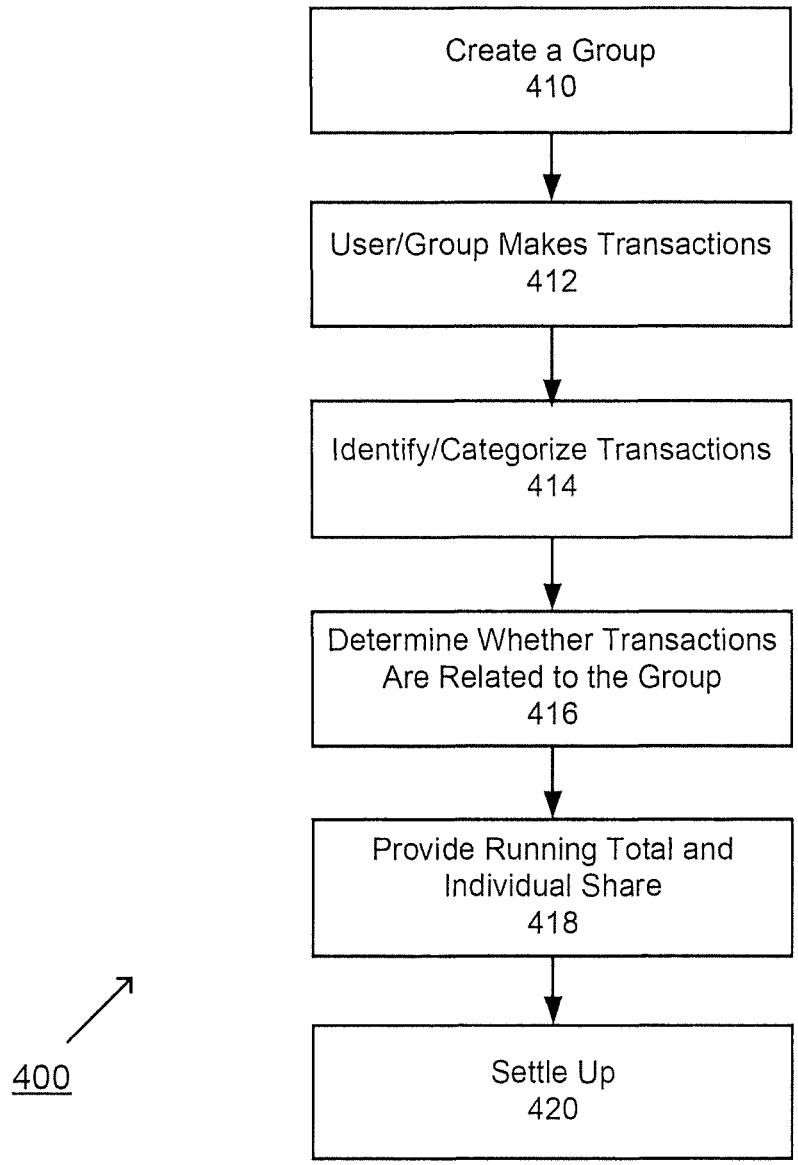
FIG. 4 is an exemplary flowchart of a method for processing transactions associated with a group, according to an embodiment of the present invention.

FIG. 4 is an exemplary flowchart of a method for processing transactions associated with a group, according to an embodiment of the present invention. At step 410, a user may create a group. At step 412, each group member may make transactions. At step 414, the system may identify and/or categorize each transaction. At step 416, the system may determine whether each transaction is associated with the group. At step 418, the system may provide a running total and individual share. At step 420, the system may enable a user to settle up at any time. The order illustrated in FIG. 4 is merely exemplary. While the process of FIG. 4 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

At step 410, a user may create a group. The group may related to a trip, activity, event and/or other purpose that involves more than one user. For example, a group of users may take a trip together or participate in an event or other activity. Other examples may include groups involving roommates, activities, family events, etc. The group may also be created to manage events having a periodic or long term duration (e.g., weekly dinners, monthly club events, etc.). The group may share periodic costs, such as utilities, groceries and rent shared by roommates. The group may be created based on category, location, date range and/or other factors.

Figure 5:
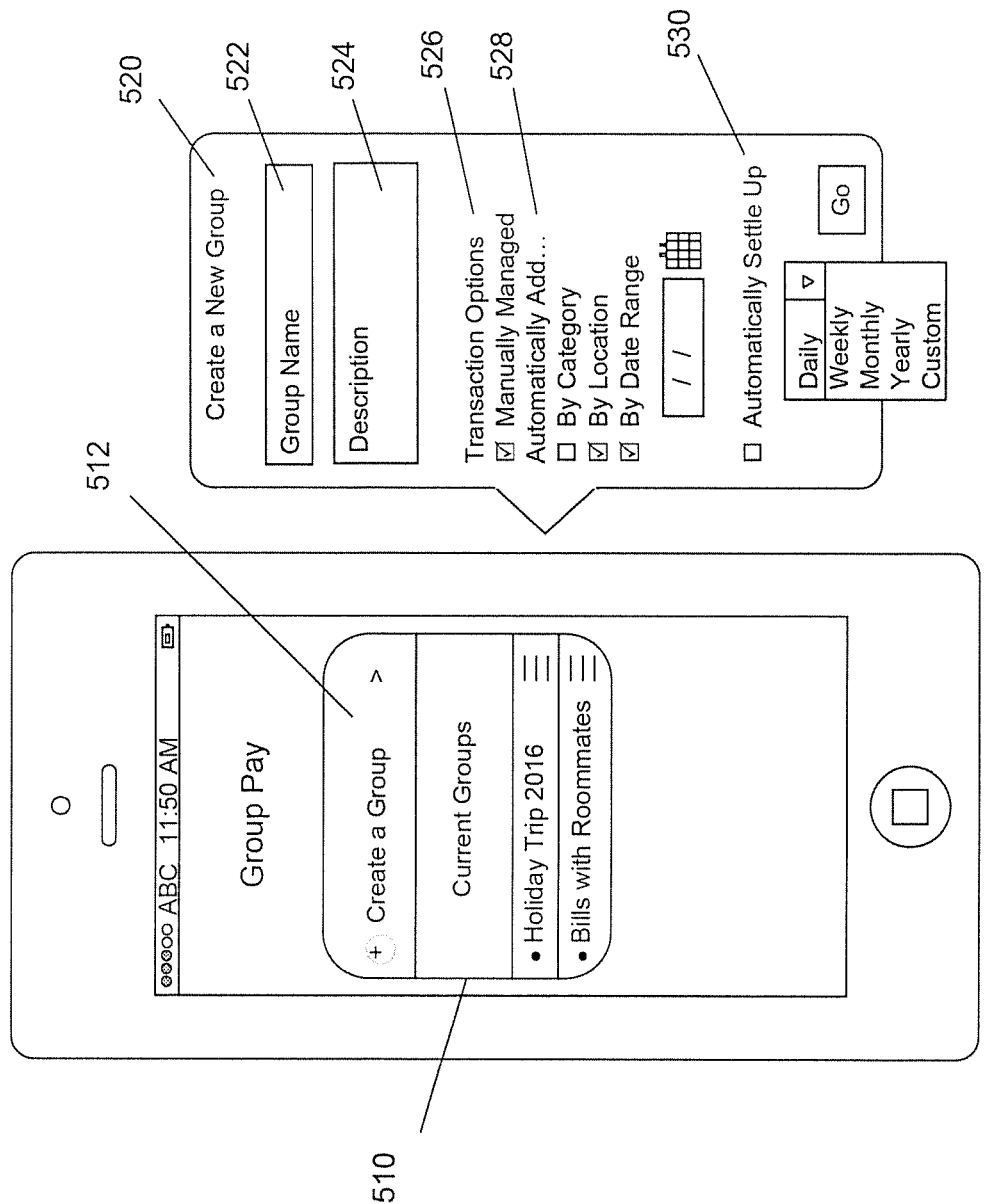
FIG. 5 is an exemplary illustration of a group transaction, according to an embodiment of the present invention.

FIG. 5 is an exemplary illustration of a group transaction, according to an embodiment of the present invention. For example, Current Groups may be accessed at 510. In this example, current groups may include Holiday Trip 2016 and Bills with Roommates. A user may create a new group at 512, using window 520. In this example, the user may provide a Group Name 522, Description 524 and identify Transaction Options at 526. Transaction Options may be manually managed or automatically added, as shown by 528. For example, transactions may be automatically added by category, location and/or date range. Other factors may be identified or used to define a group. In the beach vacation example, a user may indicate that transactions occurring during the duration of the beach vacation will be automatically added to the Group. Also, transactions occurring at or near the beach may be included. The system may also identify a settle up date. The group transaction may be settled at the end of the group, periodically for groups sharing recurring charges and expenses (e.g., roommates) and/or other customized time period, at 530. For example, the user may signify the end of a group transaction by identifying an end time, ending or closing the group and/or by requesting a settling of the costs.

Figure 6:
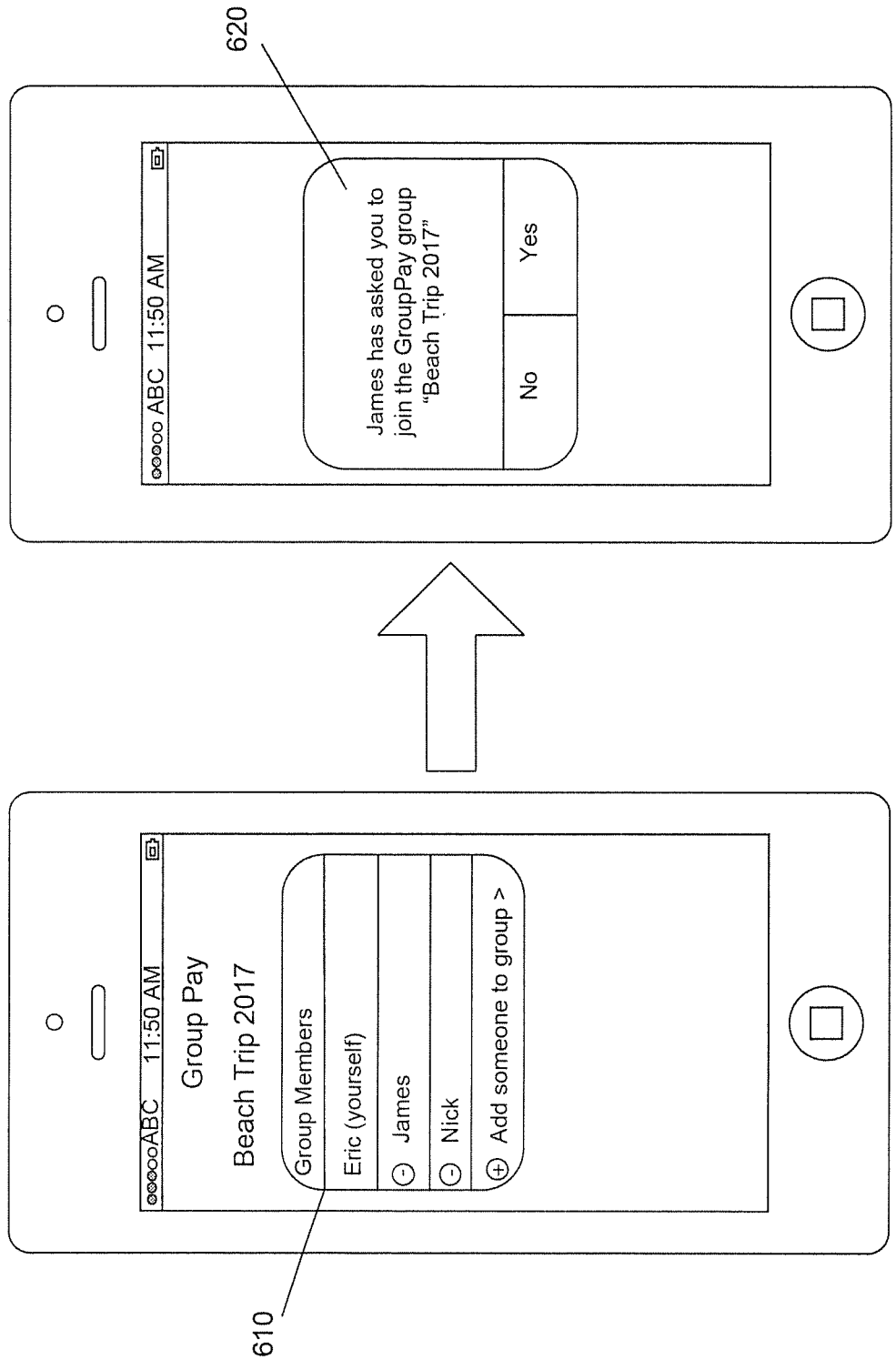
FIG. 6 is an exemplary user interface for a group pay feature, according to an embodiment of the present invention.

FIG. 6 is an exemplary user interface for a group pay feature, according to an embodiment of the present invention. As shown in FIG. 6, the user interface may display group members. As shown by 620, a user may request to be added to the group. The user may also add or invite a group member. This may occur via text message, NFC and/or other communication protocol or technology. Other types of communication may be implemented.

At step 412, each group member may make transactions. As a member of a group makes transactions, an embodiment of the present invention may categorize and manage related transactions based on transaction options. For example, transactions made at or near the beach during a predefined time period may be recognized and managed by an embodiment of the present invention. The system may recognize that recurring transactions (e.g., phone bills, subscriptions, monthly charges, etc.) may be excluded from the group even though such transactions are made during the predefined time period. For example, the system may exclude periodic and other unrelated payments, such as recurring payments that were set up prior to the creation of the group.

The system may automatically identify a valid geographic area for transactions relating to the group. For example, transactions made at or within 15 miles of the beach location may be added to the group. Online transactions may be included for activities occurring at the designated location or other current location. Also, transportation and other related costs made during the relevant time period and along the route taken by the members may be added. This may include gas station transactions, meals, tolls, etc.

A member may specify different payment instruments for expenses. For example, a member may indicate that purchases made with a credit card are part of the group and purchases made with a debit card are personal expenses and therefore should be excluded from the group.

At step 414, the system may categorize each transaction. An embodiment of the present invention may identify a category for each transaction. According to an embodiment of the present invention, transaction details may be provided, as described in provisional application 62/352,329, filed Jun. 20, 2016, entitled "System and Method for Enrichment of Transaction Data," the contents of which are incorporated by reference herein in its entirety. For example, transaction details may include data that uniquely identifies a merchant as well as provide other characteristics, such as merchant data, transaction data, location data, customer purchase insights, etc.

Figure 7:
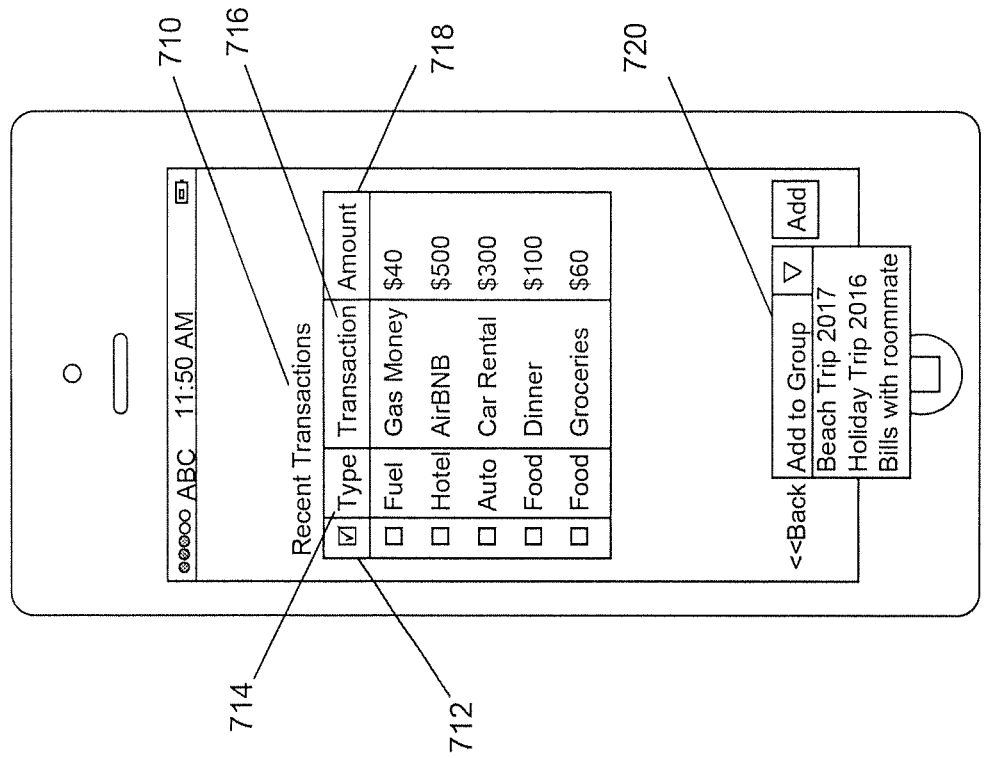
FIG. 7 is an exemplary user interface that displays recent transactions, according to an embodiment of the present invention.

FIG. 7 is an exemplary user interface that displays recent transactions, according to an embodiment of the present invention. As shown in FIG. 7, a user may view recent transactions at 710. The user may add or remove transaction at 712. Other types of user interaction may be implemented. Each transaction may have an associated type 714, transaction name 716 and amount, 718 for example. Other characteristics of the transactions may be displayed. In addition, transactions may be sorted, filtered, searched, etc.

At step 416, the system may determine whether each transaction is associated with the group. In addition, each group member may add, remove or otherwise revise transactions.

The user may then add the selected transactions (at 712) to a pending group, at 720. The transactions may also be included or excluded automatically. This may be based on predetermined rules, for example. According to an embodiment of the present invention, the system may identify and category transactions that meet certain requirements and characteristics. Each member may then have an option to exclude, add and/or correct transactions as part of the group.

According to another example, the system may observe and learn from a user's behavior including a user's exclusion behavior, e.g., this may refer to items that the user excludes from the group. Also, the system may recognize that certain purchases that are for an individual are likely excluded. For such purchases, the system may prompt the user to confirm that the purchase should (or should not) be included. For example, a purchase for a coffee and donut is likely for the individual member and not for the group. Also, a purchase made at a souvenir store is likely a personal charge and therefore excluded from the group.

An embodiment of the present invention may also include a dispute or question feature that alerts the other members that a transaction may be incorrect and not part of the group. A section to provide an explanation (as well as chat or discussion board) may also be provided.

An embodiment of the present invention may also include an option to attach or upload images, receipts, etc. to manage transactions. This may be particularly useful for transactions that will be reimbursed to an employer or other entity. For example, a user may use this information to generate an expense report and further separate personal or group expenses and business expenses.

Figure 8:
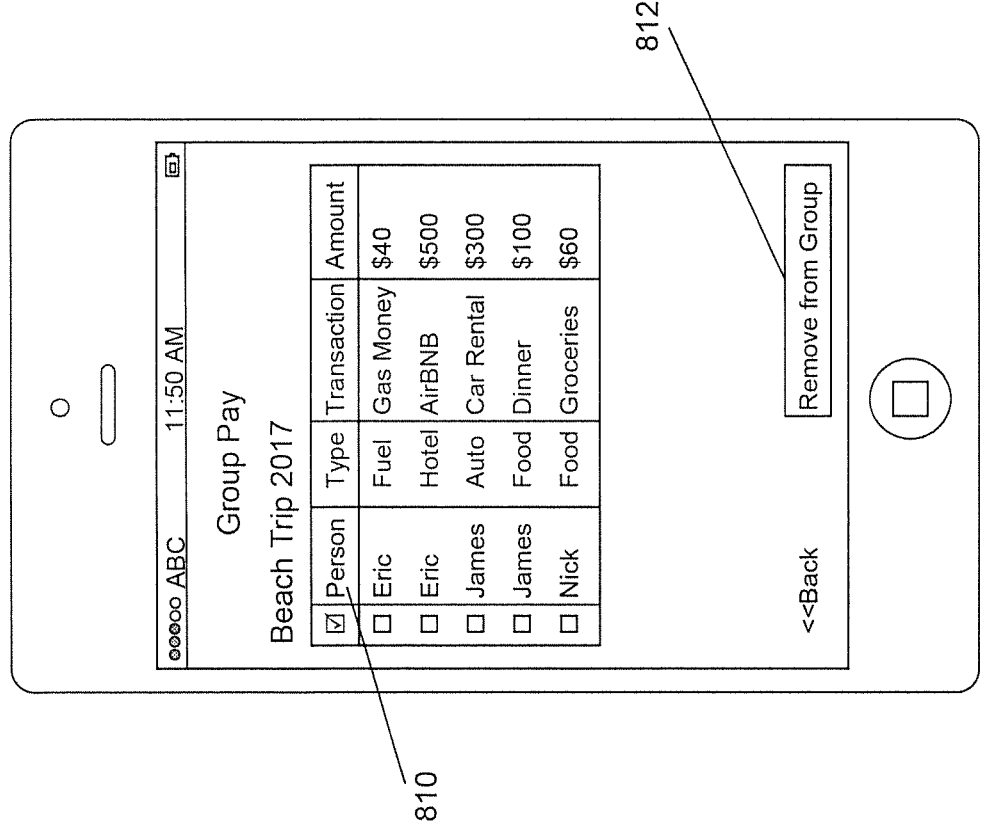
FIG. 8 is an exemplary user interface that displays recent transactions, according to an embodiment of the present invention.

FIG. 8 is an exemplary user interface that displays recent transactions, according to an embodiment of the present invention. In this example, transaction details also include the person making the transaction, as shown by 810. Certain transactions may be removed from the group, at 812.

At step 418, the system may provide a running total and individual share.

Figure 9:
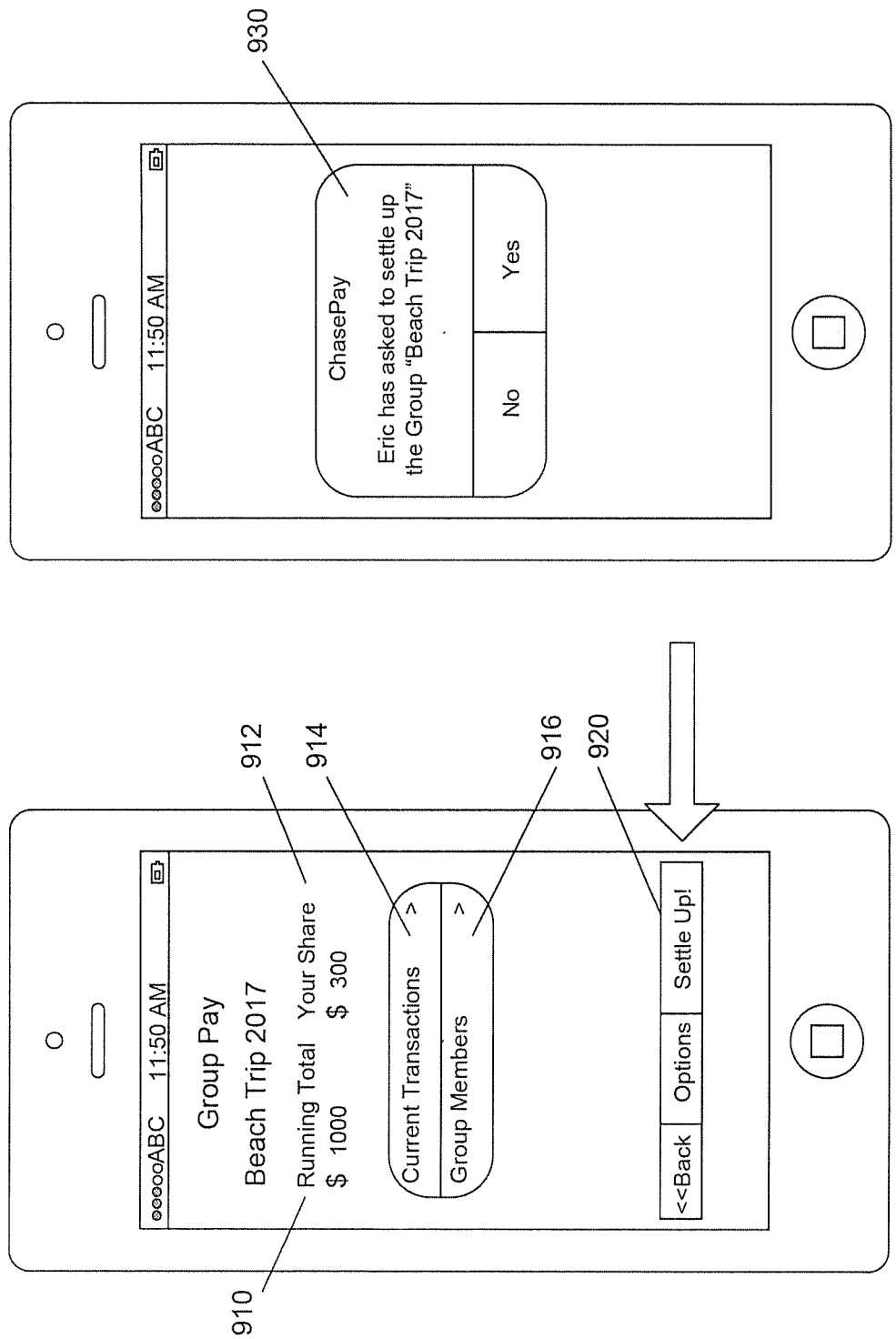
FIG. 9 is an exemplary user interface, according to an embodiment of the present invention.

FIG. 9 is an exemplary user interface, according to an embodiment of the present invention. As shown in FIG. 9, the user interface may display a running total at 910 and a member's current share, at 912. The user may also view current transactions at 914 and group members at 916. A user may request a settle-up by selecting 920. A message, such as 930, may be displayed to group members.

According to an embodiment of the present invention, a user may be a member of multiple groups with different members. The system provides an efficient solution to manage multiple group events, etc.

At step 420, the system may enable a user to settle up at any time. For example, members of a group may participate for a portion of the event and therefore request a settle up earlier or even later than the group.

Figure 10:
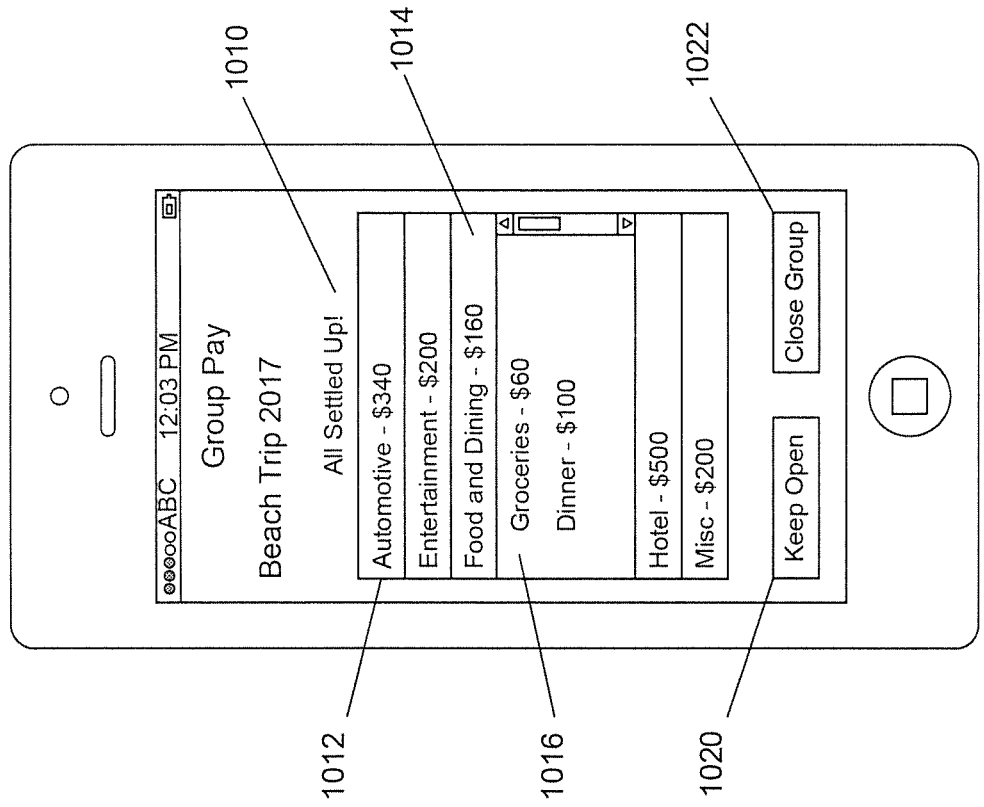
FIG. 10 is an exemplary user interface for a settle up feature, according to an embodiment of the present invention.

FIG. 10 is an exemplary user interface for a settle up feature, according to an embodiment of the present invention. User Interface 1010 may provide expenses for categories of spend. In this example, the user may access amounts for each category, as shown by 1012, which may include Automotive, Entertainment, Food and Dining, Hotel and Miscellaneous. By selecting a category at 1014, such as Food and Dining, the user may view details, as illustrated by 1016. Additional details may be provided for a more detailed split of expenses (e.g., line item detail, menu detail, etc.).

The user may then decide whether to keep the group open at 1020 or to close the group at 1022.

Figure 11:
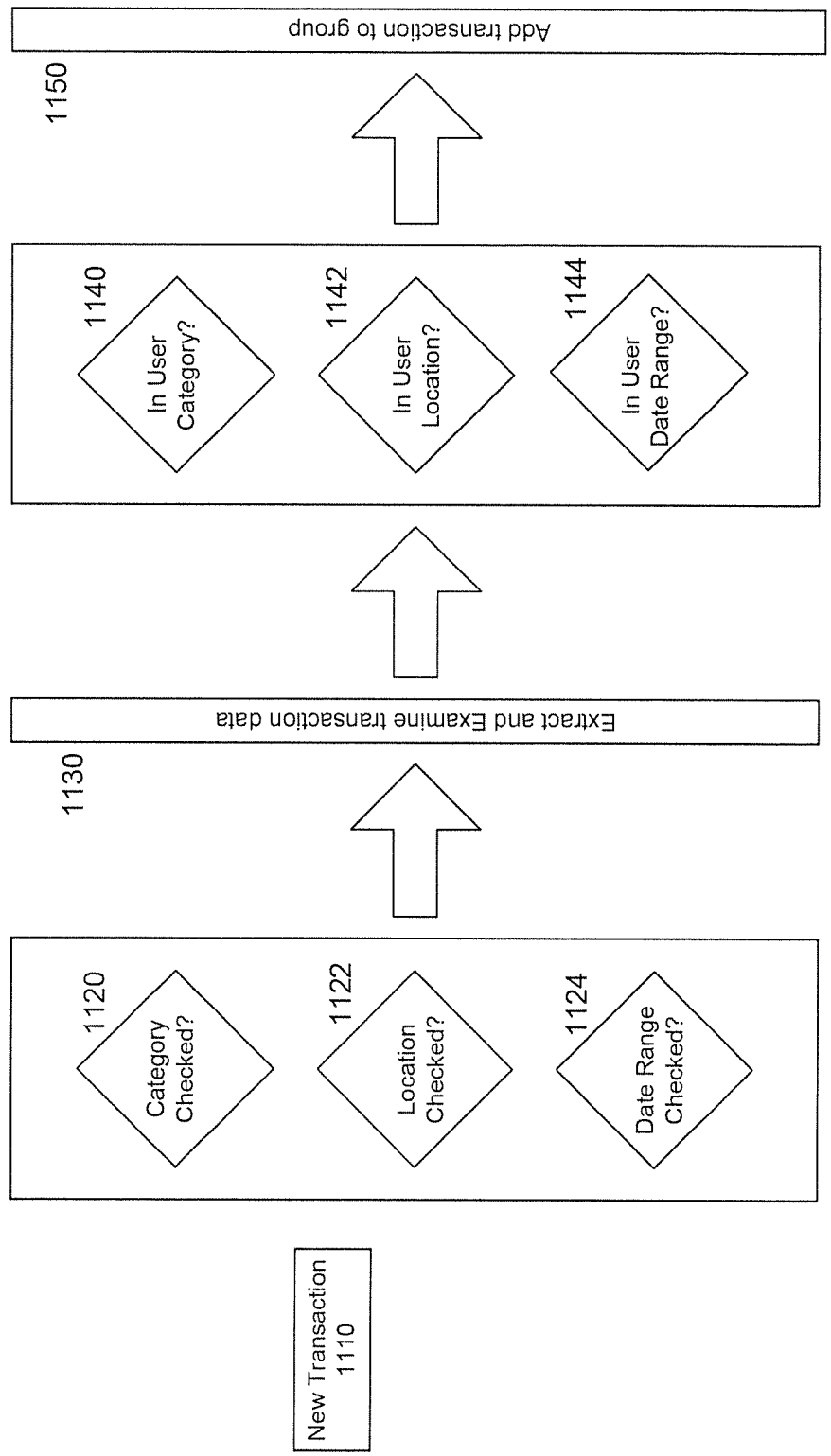
FIG. 11 is an exemplary process flow diagram for processing a group transaction, according to an embodiment of the present invention.

FIG. 11 is an exemplary process flow diagram, according to an embodiment of the present invention. A new transaction may be received at 1110. The transaction may then be added to the group based on transaction options, such as Category 1120, Location 1122 and Date Range 1124. Other options may be identified and applied. The system may then extract and examine transaction data at 1130. The system may then determine whether the transaction qualifies under User Category 1140, User Location 1142 and User Date Range 1144. The system may then add the transaction to the group at 1150, where the transaction is not already present and is not part of another group. The order illustrated in FIG. 11 is merely exemplary. While the process of FIG. 11 illustrates certain steps performed in a particular order, it should be understood that the embodiments of the present invention may be practiced by adding one or more steps to the processes, omitting steps within the processes and/or altering the order in which one or more steps are performed.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, FIG. 1 includes a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers in FIG. 1 may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, and/or JavaScript. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices 120, 130 or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although, the examples above have been described primarily as using a software application ("app") downloaded onto the customer's mobile device, other embodiments of the invention can be implemented using similar technologies, such as transmission of data that is displayed using an existing web browser on the customer's mobile device.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A mobile device that processes a plurality of transactions shared by a group of members, the mobile device comprising:
   a memory; and
   a computer processor, coupled to the memory, programmed to:
   receive from a customer to select customers of a group of customers from a contact list on the customer's mobile phone;
   transmit a code to the customer and automatically shares the code to the group of customers;
   transmit a notification to each of the customers of the group of customers informing that they are responsible of transactions;
   receive acceptances or confirmations of the notification from the group of customers;
   receive feedbacks from the group of customers regarding a plurality of behaviors far of the group of customers, the plurality of behaviors comprising: one or more businesses frequented, timing of the visits to the one or more businesses, and spending patterns at the one or more businesses;
   implement and train a machine learning using the received feedbacks and the acceptances of the notification so that the machine learning learns the plurality of behaviors of the group of customers and other characteristics of the transactions;
   identifies from the group of customers, via the trained machine learning, a plurality of members of a group sharing an event based on those learned behaviors;
   identify, via the trained machine learning, a plurality of transactions made by each member of the group;
   determine, via the trained machine learning, whether each transaction is relevant to the event;
   observe, via the trained machine learning, data of relationships between the plurality of group members and their concurrent attendance at a location when the plurality of transactions are made;
   continually refining, via the trained machine learning, the determination based on the observed data to improves the accuracy of the determination on an ongoing basis;
   automatically add each relevant transaction to the group based on the determination that the transaction is relevant to the event;
   automatically categorize each transaction into a category associated with the event; and
   access, via an interactive display on the mobile device, a running total of expenses associated with the event and an individual share for a member of the group at a point in time.

2. The mobile device of claim 1, wherein the event comprises a start time and an end time.

3. The mobile device of claim 1, wherein each transaction is categorized by location.

4. The mobile device of claim 1, wherein each transaction is categorized by time period.

5. The mobile device of claim 1, wherein each transaction is identified by a category.

6. The mobile device of claim 1, wherein the category comprises one or more of: lodging, transportation, food and entertainment.

7. The mobile device of claim 1, wherein the computer processor is further programmed to receive a request to settle up from a member of the group.

8. The mobile device of claim 1, wherein an additional group member is added in response to an electronic request to join the group.

9. The mobile device of claim 1, wherein a transaction made within a predetermined geographic area is automatically added to the group.

10. The mobile device of claim 1, wherein a transaction made within a predetermined time period is automatically added to the group.

11. A method of implementing a mobile device that processes a plurality of transactions shared by a group of members, the method comprising the steps of:
    receive from a customer to select customers of a group of customers from a contact list on the customer's mobile phone;
    transmit a code to the customer and automatically shares the code to the group of customers;
    transmit a notification to each of the customers of the group of customers informing that they are responsible of transactions;
    receive acceptances or confirmations of the notification from the group of customers;
    receive feedbacks from the group of customers regarding a plurality of behaviors of the group of customers, the plurality of behaviors comprising: one or more businesses frequented, timing of the visits to the one or more businesses, and spending patterns at the one or more businesses;
    implement and train a machine learning using the received feedbacks and the acceptances of the notification so that the machine learning learns the plurality of behaviors of the group of customers and other characteristics of the transactions;
    identifies from the group of customers, via the trained machine learning, a plurality of members of a group sharing an event based on those learned behaviors;
    identify, via the trained machine learning, a plurality of transactions made by each member of the group;
    determine, via the trained machine learning, whether each transaction is relevant to the event;
    observe, via the trained machine learning, data of relationships between the plurality of group members and their concurrent attendance at a location when the plurality of transactions are made;
    continually refining, via the trained machine learning, the determination based on the observed data to improves the accuracy of the determination on an ongoing basis;
    automatically add each relevant transaction to the group based on the determination that the transaction is relevant to the event;
    automatically categorize each transaction into a category associated with the event; and
    access, via an interactive display on the mobile device, a running total of expenses associated with the event and an individual share for a member of the group at a point in time.

12. The method of claim 11, wherein the event comprises a start time and an end time.

13. The method of claim 11, wherein each transaction is categorized by location.

14. The method of claim 11, wherein each transaction is categorized by time period.

15. The method of claim 11, wherein each transaction is identified by a category.

16. The method of claim 11, wherein the category comprises one or more of: lodging, transportation, food and entertainment.

17. The method of claim 11, further comprising the step of: receiving a request to settle up from a member of the group.

18. The method of claim 11, wherein an additional group member is added in response to an electronic request to join the group.

19. The method of claim 11, wherein a transaction made within a predetermined geographic area is automatically added to the group.

20. The method of claim 11, wherein a transaction made within a predetermined time period is automatically added to the group.

* * * * *

UNITED STATES PATENT AND TRADEMARK OFFICE
CERTIFICATE OF CORRECTION

| | | |
|---|---|---|
| PATENT NO. | : 11,132,661 B1 | Page 1 of 1 |
| APPLICATION NO. | : 15/461844 | |
| DATED | : September 28, 2021 | |
| INVENTOR(S) | : James P. White, III and Eric Han Kai Chang | |

It is certified that error appears in the above-identified patent and that said Letters Patent is hereby corrected as shown below:

In the Claims

In Claim 1, Column 15, Line 19, amend "a plurality of behaviors far of the group of customers," to --a plurality of behaviors of the group of customers,"--

Signed and Sealed this
Seventh Day of December, 2021

Drew Hirshfeld
*Performing the Functions and Duties of the
Under Secretary of Commerce for Intellectual Property and
Director of the United States Patent and Trademark Office*